US009115911B2

(12) United States Patent
Desi-Seulean et al.

(10) Patent No.: US 9,115,911 B2
(45) Date of Patent: Aug. 25, 2015

(54) DIRECT-FIRED DUCTABLE HEATER

(75) Inventors: Sergiu Desi-Seulean, Coaldale (CA); David Wiebe-Neufeldt, Lethbridge (CA); Jerry Ejdrygiewicz, Lethbridge (CA)

(73) Assignee: Haul-All Equipment Ltd., Lethbridge, Alberta (CA)

( * ) Notice: Subject to any disclaimer, the term of this patent is extended or adjusted under 35 U.S.C. 154(b) by 1542 days.

(21) Appl. No.: 12/221,170

(22) Filed: Jul. 31, 2008

(65) Prior Publication Data

US 2010/0024794 A1    Feb. 4, 2010

(51) Int. Cl.
| | |
|---|---|
| *F24H 3/02* | (2006.01) |
| *F24H 3/04* | (2006.01) |
| *F23D 14/20* | (2006.01) |
| *F23D 14/58* | (2006.01) |
| *F23D 99/00* | (2010.01) |
| *F24H 9/18* | (2006.01) |
| *F24H 3/06* | (2006.01) |

(52) U.S. Cl.
CPC .............. *F24H 3/0488* (2013.01); *F23D 14/20* (2013.01); *F23D 14/58* (2013.01); *F23D 21/005* (2013.01); *F24H 9/1881* (2013.01); *F23D 2900/21003* (2013.01); *F24H 3/065* (2013.01); *Y02B 30/28* (2013.01)

(58) Field of Classification Search
CPC ............................... F24H 3/0488; F24H 3/065
USPC ..... 126/110 B, 110 C, 110 D; 431/8, 10, 158, 431/278, 285, 350, 353
See application file for complete search history.

(56) References Cited

U.S. PATENT DOCUMENTS

| | | | | | |
|---|---|---|---|---|---|
| 2,715,399 | A | * | 8/1955 | Witt et al. ................. | 126/110 B |
| 3,145,978 | A | * | 8/1964 | Tolson ............................ | 432/45 |
| 3,319,947 | A | * | 5/1967 | Truesdell ........................ | 432/32 |
| 3,401,920 | A | * | 9/1968 | Berkhoudt et al. ........... | 432/223 |
| 3,645,512 | A | * | 2/1972 | Dent et al. ..................... | 432/223 |
| 3,706,446 | A | * | 12/1972 | Briggs .......................... | 432/224 |
| 3,733,147 | A | * | 5/1973 | Felker ....................... | 416/214 R |
| 4,081,238 | A | * | 3/1978 | Briggs et al. .................. | 432/222 |
| 4,089,642 | A | * | 5/1978 | Briggs et al. .................. | 432/222 |
| 4,201,544 | A | * | 5/1980 | Briggs et al. .................. | 432/222 |

(Continued)

OTHER PUBLICATIONS

DESA Brochure for Propane Construction Forced Air Heater (44 pages).

(Continued)

*Primary Examiner* — Kenneth Rinehart
*Assistant Examiner* — Gajanan M Prabhu
(74) *Attorney, Agent, or Firm* — Dilworth & Barrese, LLP.

(57) ABSTRACT

A direct-fired heater suitable for connection to duct work is provided. The heater comprises a combustion chamber defined by a combustion chamber wall, a burner plate at one end proximate a fan blade and an exhaust plate at an opposite end, the burner plate having openings therein for allowing airflow into the combustion chamber and the exhaust plate have an opening therein for allowing exit of heated exhaust from the combustion chamber, the combustion chamber wall extending past the burner plate. A first airflow zone exists between the outer shell and the combustion chamber allowing airflow between the fan blade and the outlet in the outer shell. An injector for injecting gas into the combustion chamber in proximity to the openings in the burner plate is used. The heater also comprises a nose cone between the outlet in the outer shell and the exhaust plate.

23 Claims, 4 Drawing Sheets

(56) References Cited

U.S. PATENT DOCUMENTS

| | | | |
|---|---|---|---|
| 4,244,349 A * | 1/1981 | Velie et al. | 126/110 C |
| 4,313,417 A * | 2/1982 | Briggs et al. | 126/110 B |
| 4,340,362 A * | 7/1982 | Chalupsky et al. | 432/222 |
| 4,443,187 A * | 4/1984 | Shaftner et al. | 432/222 |
| 5,494,437 A * | 2/1996 | Kubota et al. | 431/181 |
| 5,520,537 A * | 5/1996 | Taylor | 431/353 |
| 5,806,443 A * | 9/1998 | Kobayashi et al. | 110/262 |
| 5,863,192 A * | 1/1999 | Motegi | 431/8 |
| 6,142,141 A * | 11/2000 | Long | 126/110 B |
| 6,364,632 B1 * | 4/2002 | Cromm et al. | 417/372 |
| 2007/0144178 A1 * | 6/2007 | Burd et al. | 60/753 |

OTHER PUBLICATIONS

Warnock Hersey Brochure for Heat Cannon THC 85N/175N (12 pages).

* cited by examiner

DIRECT-FIRED DUCTABLE HEATER

FIELD OF THE INVENTION

The invention relates to heaters typically used in temporary applications and more specifically to direct-fired ductable heaters.

BACKGROUND

Heaters are typically used in temporary applications, such as construction sites, as a temporary heat source before a primary and permanent heat source is functional and usable or for example for heating event tents. Traditionally, most heaters for this type of application comprise a burner inside a tubular housing, with a fan behind the burner blowing air around the burner and out of the end of the heater. This is known as a direct-fired heater in that the combustion gases flow directly into the heated space. There are also indirect-fired construction heaters that incorporate a heat exchanger to permit the venting of combustion gases out of the heated space. Indirect-fired heaters are inherently less efficient in that a portion of the heat is normally lost through the exhaust. Indirect-fired heaters are also inherently larger because they require a heat exchanger and therefore a larger cross-section to handle the airflow.

Most construction heaters that are used with ductwork are of the indirect-fired type. The main reason for this is that the variation in airflow when a heater is ducted can significantly impact the quality of combustion in a direct-fired heater, leading to increases in harmful emissions such as carbon monoxide. This is because of the increase in backpressure inherent with the attachment of ductwork to the heater. Heaters used in temporary applications must be able to function safely within the full range of installations in which they may be employed.

Due to the high operating temperatures inherent to heaters, the operational lifetime of various components, such as the burner, gas lines, the walls of the combustion chamber, etc., tend be short unless higher grade or heavier materials are used.

A need therefore exists to provide a direct-fired heater suitable for use with ductwork that overcomes one or more of the shortcomings outlined above or in the art.

SUMMARY

A direct-fired heater suitable for use either with or without ductwork is provided. The heater uses one or more airflow zones surrounding a combustion chamber for guiding air between a fan blade and an outlet of the heater. Hot exhaust from the combustion chamber is mixed with the air exiting from the one or more airflow zones. The heater may contain a nose cone positioned to create a venturi effect with the heated air and the air passing through one or more of the airflow zones. Back pressure inherent from the attachment of ductwork to the heater has a minimal effect on airflow through the combustion chamber as a positive pressure zone is created between a burner plate of the combustion chamber and the fan blade by extending the wall of the combustion chamber, or a heat shield separating the combustion chamber and the outer shell of the heater, past the burner plate and toward the fan blade. As a result, the direct-fired heater may be used with ductwork without a significant drop in combustion quality.

In one embodiment, there is provided a direct-fired heater connectable to ductwork, the heater comprising:

an outer shell comprising an inlet for allowing inlet of air to be heated and an outlet for exhausting heated air;

a fan blade operatively connected to a fan motor for operating the fan blade;

a combustion chamber within the outer shell defined by a combustion chamber wall, a burner plate at one end proximate the fan blade and an exhaust plate at an opposite end, the burner plate having openings therein for allowing airflow into the combustion chamber and the exhaust plate having one or more openings therein for allowing exit of heated exhaust from the combustion chamber, the combustion chamber wall extending past the burner plate;

a first airflow zone between the outer shell and the combustion chamber wall allowing airflow between the fan blade and the outlet in the outer shell;

an injector for injecting gas into the combustion chamber in proximity to the openings in the burner plate;

a nose cone between the outlet in the outer shell and the exhaust plate, the nose cone positioned to allow airflow through the exhaust plate and out of the outlet;

wherein the burner plate is located in a position proximate the fan blade suitable to cause recirculation of air blown by the fan blade to cool the injector and burner plate during operation of the heater.

In another embodiment there is provided a direct-fired heater connectable to ductwork, the heater comprising:

an outer shell comprising an inlet for allowing inlet of air to be heated and an outlet for exhausting heated air;

a fan blade operatively connected to a fan motor for operating the fan blade;

a combustion chamber defined by a combustion chamber wall, a burner plate at one end proximate the fan blade and an exhaust plate at an opposite end, the burner plate having openings therein for allowing airflow into the combustion chamber and the exhaust plate having one or more openings therein for allowing exit of heated exhaust from the combustion chamber;

a heat shield between the combustion chamber wall and the outer shell;

a first airflow zone between the outer shell and the heat shield allowing airflow between the fan blade and the outlet in the outer shell;

a second airflow zone between the heat shield and the combustion chamber wall allowing airflow between the fan blade and the outlet in the outer shell;

an injector for injecting gas into the combustion chamber in proximity to the openings in the burner plate;

a nose cone between the outlet in the outer shell and the exhaust plate, the nose cone positioned to allow airflow through the exhaust plate and out of the outlet;

a blower plate adjacent the outer perimeter of the fan blade for minimizing recirculated air from flowing past the fan blade;

wherein the burner plate is located in a position proximate the fan blade suitable to cause recirculation of air blown by the fan blade to cool the injector during operation of the heater; and wherein one or both of either the heat shield or the combustion chamber wall extends past the burner plate toward the fan blade.

DETAILED DESCRIPTION

Figure 1:
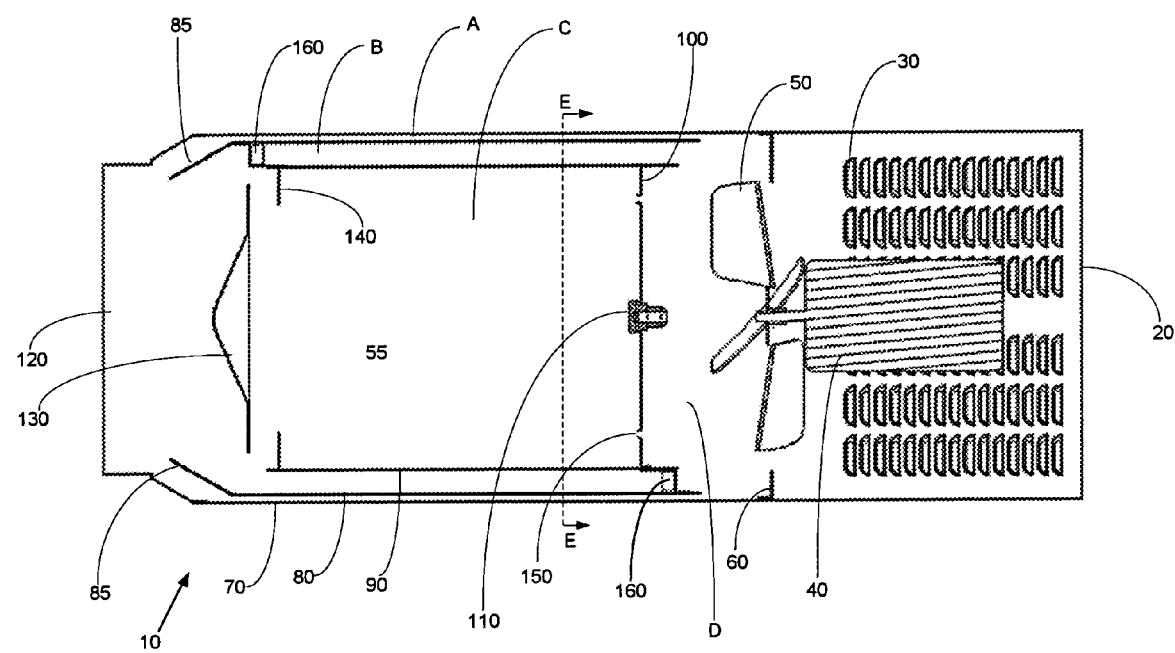
FIG. 1 is a schematic illustrating an example of a direct-fired ductable heater.

FIG. 1 is a schematic illustrating an example of a direct-fired heater suitable for use with ductwork. The heater is shown generally at 10. The heater 10 has an outer shell 70 with an intake in one end allowing for the intake of air to be heated and an exhaust outlet 120 in the other end for allowing heated air to exit the heater 10. An optional intake may also be used, for example in the form of louvers 30 in the outer shell 70. Based on the amount of heat desired, the intake 20 and optionally 30 may vary in size as desired.

A fan motor 40 is used to drive a fan blade 50 and is powered by any conventional means.

A blower plate 60 is used to prevent or minimize recirculation of air past the fan blade 50. The clearance between the blower plate 60 and the fan blade 50 may be small enough to stop the recirculation, thereby increasing the efficiency of the heater 10.

A combustion chamber 55 of the heater 10 is defined by a combustion chamber wall 90, a burner plate 100 at one end and an exhaust plate 140 at an opposite end. Combustion takes place in what will be referred to for the purposes of this specification as a combustion zone C in the combustion chamber 55. The burner plate 100 has a series of openings 150 that allow for air to be pushed through the burner plate 100 by the fan blade 50. Although only two openings 150 are illustrated in FIG. 1, any number of openings may be used to allow airflow through the burner plate 100 as will be disclosed in more detail below. The space defined by the burner plate 100 and the fan blade 50 will be referred to as recirculation zone D for the purposes of this specification and will be disclosed in more detail further below. The exhaust plate 140 has one or more exhaust openings therein allowing for exhausting of hot exhaust from the combustion chamber 55. A gas injector 110 connected to the burner plate 100 injects fuel in the form of gas, usually either natural gas or propane, into the combustion chamber 55. The injected gas combines with air being pushed through the burner plate 100.

A nose cone 130, positioned exterior the exhaust plate 140, directs exhaust from the combustion chamber 55 and out of the outlet 120. An optional heat shield 80 is situated between the combustion chamber wall 90 and the outer shell 70. An air passage is defined by the gap between the heat shield 80 and the combustion chamber wall 90. For the purposes of this specification, this air gap will be referred to as zone B. An additional air passage is defined by the gap between the heat shield 80 and the outer shell 70. For the purposes of this specification, this air gap will be referred to as zone A. The heat shield 80 is shown as being connected to the combustion chamber wall 90 using a plurality of brackets 160. It should be understood that any suitable connection device may be used to secure the heat shield 80 in the heater 10. The heat shield 80 may additionally or alternatively be secured to the outer shell 70 using spacers or by any suitable connection device. As outlined above, any suitable device may be used to secure the heat shield 80 to the combustion chamber wall 90 and/or the outer shell 70, however, at least zone A or zone B must be maintained to allow for airflow between the outlet 120 and recirculation zone D. In one embodiment, no heat shield is used and a single airflow zone is defined by the space between the combustion chamber wall 90 and the outer shell 70.

As illustrated in FIG. 1, the heat shield 80 comprises an optional deflector segment 85 on the exhaust side of the heater. The deflector segment 85 guides the airflow from zones A and B inwards increasing the rate at which the cooler air flowing though zones A and B mixes with the heated exhaust being exhausted from the combustion chamber 55. The relative positioning of the deflector segment 85, the nose cone 130, the combustion chamber wall 90, and the exhaust plate 140 creates a venturi effect that increases the airflow efficiency through the combustion chamber 55. It should be understood that the deflector segment 85 does not have to be integrated into the heat shield 80 but may be a separate component shaped to help mix the cooler airflow of zones A and/or B with the heated exhaust and also to create a venturi effect at the combustion chamber 55 outlet. Further, the nose cone 130 may be flat, however, a conical surface on the exhaust side of the nose cone 130 facilitates the creation of the venturi and reduces the pressure drop on air flowing through the heater 10.

The heat shield 80, in addition to both shielding the outer shell 70 from heat and defining airflow zone B, also serves to cool the combustion chamber wall 90 by allowing for airflow propelled by the fan blade 50 to absorb heat as it passes through zone B. By cooling the combustion chamber wall 90, the operational lifetime of the combustion chamber wall 90 is increased as the higher temperature causes increased fatigue on the material.

Typical heaters used in the art tend to increase the distance between the burner plate 100 and the fan blade 50 in an attempt to minimize recirculation as objects placed in front and in proximity to the fan blade 50 deflect airflow back towards the fan, especially towards the center of the fan blade 50 where the pushing effect of the fan blade 50 is lower. As a side effect, this results in a physically larger heater and also in the burner plate 100, the injector 110, and the gas line feeding the injector 110 having a very high temperature during operation.

Heaters 10 of the present invention, however, have a layout with the burner plate 100 placed in close proximity to the fan blade 50, relative to conventional heaters. The burner plate 100 is placed at a distance from the fan blade 50 suitably close to cause sufficient recirculation of the air in zone D to cool the injector 110 during operation. This recirculation increases the operational lifetime of the injector 110, the burner plate 100, and the gas line feeding the injector.

As is understood in the art, an ideal air to gas mixture is desired to obtain an efficient combustion. Connection of ductwork to heaters, such as direct-fired heaters, causes a variation in airflow due to the inherent backpressure caused by the connection of the ductwork. Airflow zones A and B are provided to reduce fluctuations of airflow in the combustion chamber 55. As outlined above, a single airflow zone may be used if no heat shield is used.

Due to the shape of the fan blade 50 and its proximity to the outer shell 70 and the burner plate 100, an inherent negative pressure field is generated generally in front of a center region of the fan blade 50 and a positive pressure field is generated generally in an outer region of the recirculation zone D. By extending the combustion chamber wall 90 and the heat shield 80 past the burner plate 100 and into the recirculation zone D, the pressure field increases and stabilizes particularly near the outer edges of the burner plate 100. It should be understood that although FIG. 1 shows both the combustion chamber wall 90 and the heat shield 80 extending into the recirculation zone D, it is not essential for both of the components to extend into the recirculation zone D. By providing for a positive pressure zone in the recirculation zone D using the airflow zones A and B, a more consistent airflow in the combustion chamber 55 and in the combustion zone C is observed thereby allowing for efficient combustion even when ductwork is attached to the heater 10. Further the extension of the heat shield 80 increases this positive pressure zone forcing a majority of the cooling air around the combustion chamber 55 through airflow zone B and maintaining minimum enough cooling flow under the outer shell 70 through airflow zone A. Airflow through zone A may be sufficient enough to keep the outer shell 70 at a temperature touchable with an unprotected hand.

Figure 2:
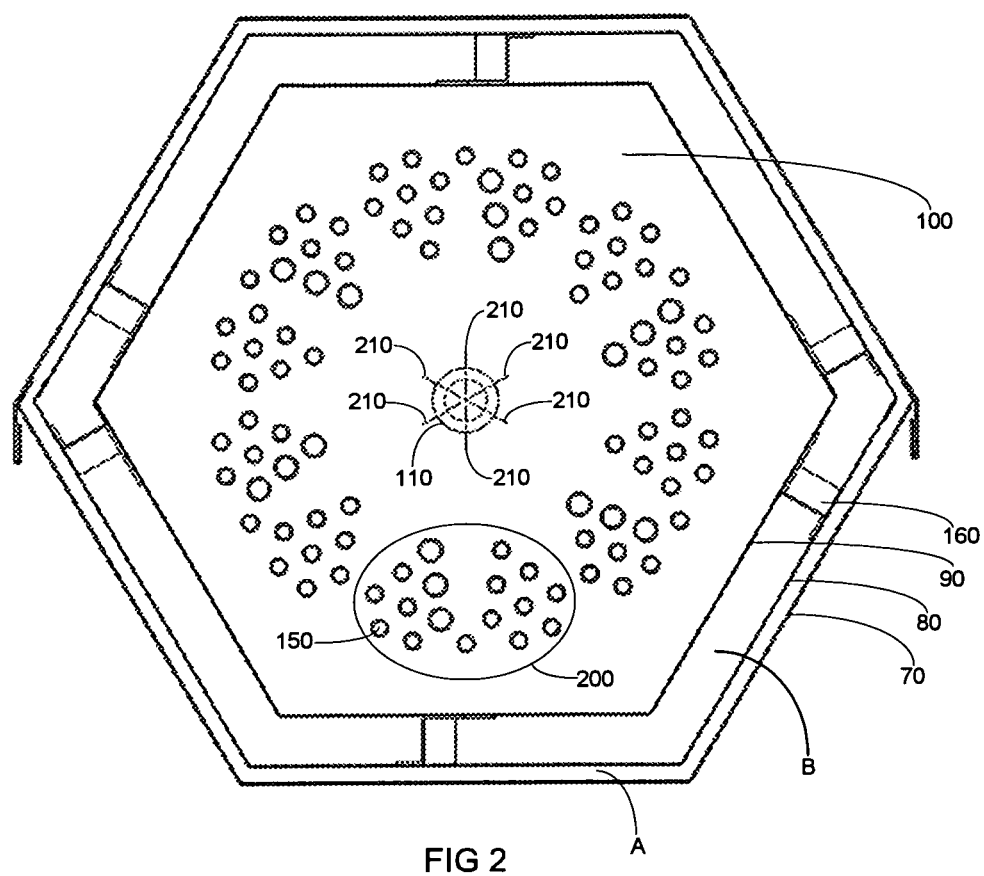
FIG. 2 is a schematic cross-section along line E-E of FIG. 1, illustrating an example of a pattern of openings of a burner plate for a direct-fired heater.

FIG. 2 is a cross-section schematic taken along line E-E of FIG. 1 illustrating an example of a burner plate 100. The burner plate 100 contains a plurality of microburners 200 comprised of one or more openings 150. An injector 110 generally in the center of the burner plate 100 is adapted to inject gas into the combustion chamber 55 (shown in FIG. 1) generally outward toward the combustion chamber wall 90 and optionally perpendicular to the combustion chamber wall 90. The gas is injected by the injector 110 in a plurality of gas streams 210. The gas streams 210 and the microburners 200 may be oriented so that each gas stream 210 directs a similar flow of gas at a corresponding microburner 200 or set of microburners. As is illustrated in FIG. 2, for example, each gas stream 210 is directed at a microburner 200 thereby resulting in a substantially even burn. The microburners 200 should have a spacing relative to each other as well as a pattern of openings 150 that encourages a continuous burn around the injector 110. Optionally, the pattern of openings 150 and spacing of each microburner 200 may encourage a substantially symmetrical burn around the injector 110. Furthermore, the openings 150 of the microburners 200 may have an area corresponding to the flow of air generated by the rotation of the fan blade 50 as illustrated in FIG. 2 to further create an even or preferably symmetrical burn around the injector 110.

Although the injector 110 is shown having six gas streams 210, it should be understood that the injector may emit any number of gas streams 210, with a minimum of two gas streams required for a balanced flame.

A plurality of brackets 160 are shown connecting the heat shield 80 to the combustion chamber wall 90, the heat shield 80 and the combustion chamber wall 90 defining airflow zone B as outlined above. The brackets 160 are shown in an angled orientation thereby guiding the airflow from the fan blade 50 in a spinning path. Alternatively, the brackets 160 may be oriented to straighten out airflow in zone B as desired.

Airflow zone A is shown defined by the heat shield 90 and the outer shell 70 as outlined above. A spacer (not shown) may be used to connect the heat shield 80 and the outer shell 70.

As can be seen in FIG. 2, the burner plate 100 has fewer openings 150 towards the center of the burner plate 100 and a higher density of openings 150 towards the outside of the burner plate 100. This orientation may be used to increase efficiency. As outlined above, a positive pressure zone is generated towards the outside of the recirculation zone D and a negative pressure zone is generated towards the center of the recirculation zone D. To increase circulation, and to minimize airflow differentiation when various lengths of ductwork are attached to the heater 10, no openings 150 may be placed in the burner plate 100 in the negative pressure region and a higher density of openings may be placed in the positive pressure region. Such an orientation also minimized and can even prevent gas mixture and/or flame from being sucked into the recirculation zone D by the negative pressure.

The burner plate 100 with microburners 200, such as those described above, forces the flame away from the injector 110 keeping the injector 110 at a lower temperature from the start. The microburners 200 may be oriented in such a way as to form a circle of multiple burners. The openings 150 of the microburners 200 may be oriented for example for balancing combustion air rotation with each opening's dimension and position creating a staged combustion which can result in low CO production and can further result in a primary recirculation for low CO and NOx generation.

The openings 150 may be extruded in the burner plate 100 in such a way that the perimeter of the opening 150 penetrates into the combustion chamber 55. This results in an enlarged recirculation zone at the base of the flame between openings 150, thereby reducing CO and NOx generation.

In one example, the increase in efficiency of the heater allowed for a ¾ horsepower (hp) motor to be used in place of a 1 hp motor and a larger diameter fan blade 50 was used in place of a smaller diameter fan blade. This requires less energy to drive the motor while maintaining heated air out of the outlet 120 and through any ductwork if attached. An increase in airflow through connected ductwork has been observed. For example, a heater such as that described in FIG. 1, directed heated airflow through a duct 16 inches in diameter and 52 feet in length.

Figure 3:
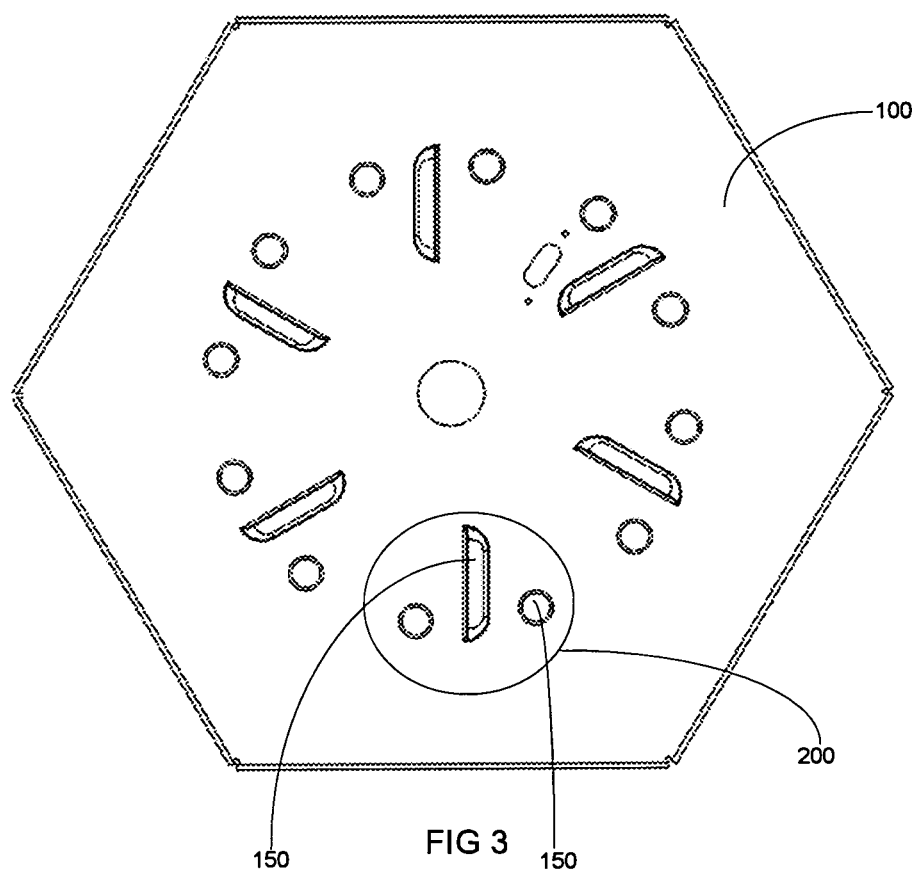
FIG. 3 is a schematic illustrating another example of the pattern of openings of a burner plate for a direct-fired heater.
Figure 4:
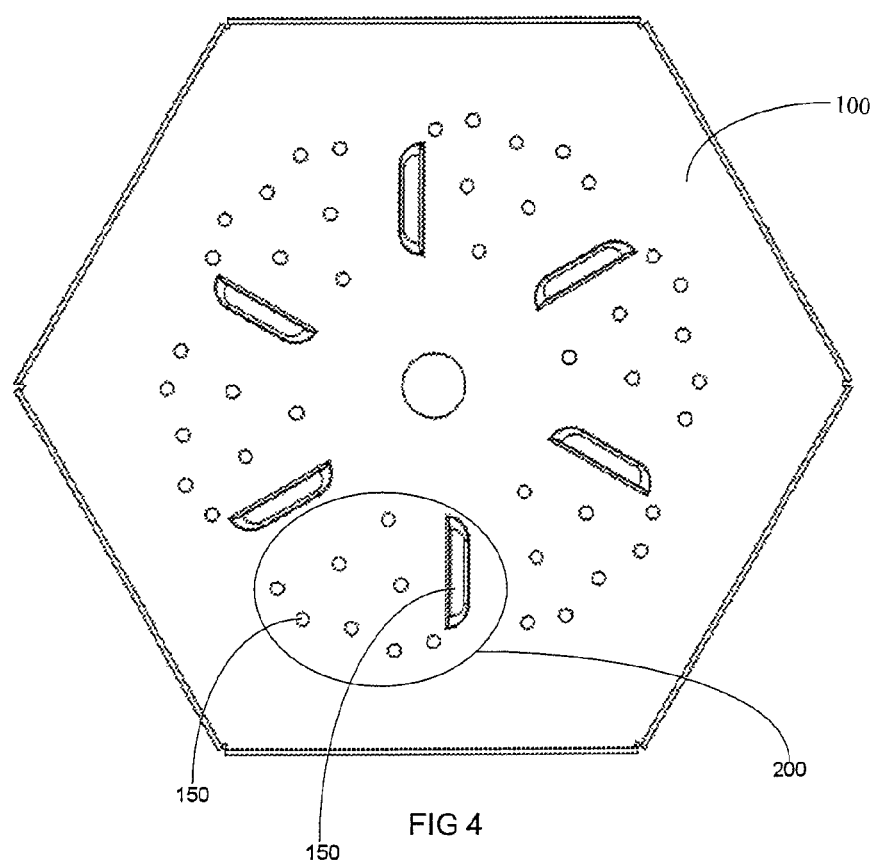
FIG. 4 is a schematic illustrating another example of the pattern of openings of a burner plate for a direct-fired heater.

FIGS. 3 and 4 are an illustration of examples of a burner plate 100 showing a different arrangement for the openings 150 of the microburners 200. The openings 150 include both holes and louvers. The louvers may be used to maintain the spin of spinning air entering the combustion chamber 55. As with the burner plate 100 shown with reference to FIG. 2, the total surface area of the openings 150 closer to the center of the burner plate 100 is smaller than the total surface area of the openings 150 further away from the center of the burner plate 100 to minimize and even stop back flow of gas and/or flame past the burner plate 100 toward the fan blade (not shown).

It will be appreciated that heaters as described herein may operate with or without ductwork connected to the outlet of the heater. Furthermore, it will be appreciated that heaters of the present invention may comprise inlet gas piping and valving as desired or required for feeding gas to the injector from a gas source.

The present invention has been described with regard to a plurality of illustrative embodiments. However, it will be apparent to persons skilled in the art that a number of variations and modifications can be made without departing from the scope of the invention as defined in the claims.

We claim:

1. A direct-fired heater connectable to ductwork, the heater comprising:
    an outer shell comprising an inlet for allowing inlet of air to be heated and an outlet for exhausting heated air;
    a fan blade operatively connected to a fan motor for operating the fan blade;
    a combustion chamber within the outer shell defined by a combustion chamber wall, a burner plate at one end proximate the fan blade and an exhaust plate at an opposite end, the burner plate having openings therein for allowing rotating airflow from the fan blade into the combustion chamber and the exhaust plate having one or more openings therein for allowing exit of heated exhaust from the combustion chamber, the combustion chamber wall extending past the burner plate;

a first airflow zone between the outer shell and the combustion chamber wall allowing airflow between the fan blade and the outlet in the outer shell;

a deflector segment for guiding airflow from the first air flow zone toward the outlet thereby mixing air exiting from the first airflow zone with the heated exhaust;

an injector for injecting gas into the combustion chamber in proximity to the openings in the burner plate;

a nose cone between the outlet in the outer shell and the exhaust plate, the nose cone positioned to allow airflow through the exhaust plate and out of the outlet;

wherein the openings in the burner plate form a plurality of microburners, each microburner comprising at least one opening, the injector adapted to inject a plurality of gas streams at the microburners, and wherein a total surface area of the openings of each microburner at a position closer to the injector is less than a total surface area of the openings of each microburner at a position farther to the injector, resulting in staged combustion in the combustion chamber; and the burner plate is located in a position proximate the fan blade suitable to cause recirculation of air blown by the fan blade to cool the injector and burner plate during operation of the heater.

2. The heater of claim 1, further comprising a heat shield between the combustion chamber and the outer shell, the heat shield defining the first airflow zone between the heat shield and the outer shell and a second airflow zone between the heat shield and the combustion chamber, the first and second airflow zones allowing airflow between the fan blade and the outlet in the outer shell.

3. The heater of claim 2, wherein the heat shield extends past the combustion chamber wall and the combustion chamber wall extends past the burner plate toward the fan blade.

4. The heater of claim 2, wherein the deflector segment is adapted to guide airflow from the first and second air flow zones toward the outlet thereby mixing air exiting from the first and second airflow zones with the heated exhaust.

5. The heater of claim 4, wherein the deflector segment is integrated into the heat shield.

6. The heater of claim 1, further comprising a blower plate adjacent the outer perimeter of the fan blade for minimizing recirculated air from flowing past the fan blade.

7. The heater of claim 6, wherein a clearance between the blower plate and the fan blade is small enough to substantially stop recirculated air from flowing past the fan blade.

8. The heater of claim 1, wherein the nose cone has a conical shape on an outlet side thereof.

9. The heater of claim 1, wherein the injector injects a substantially equal amount of gas at each microburner.

10. The heater of claim 1, wherein each microburner comprises a plurality of openings, the openings of each microburner arranged in a pattern and the microburners spaced relative to each other resulting in a substantially continuous burn around the injector or a substantially symmetrical burn around the injector.

11. The heater of claim 2, wherein the combustion chamber wall and the heat shield are connected by a plurality of brackets, the brackets oriented at either an angle for straightening airflow through the second airflow zone or oriented at an angle for spinning airflow through the second airflow zone around the combustion chamber.

12. The direct-fired heater of claim 1, wherein
the injector injects six substantially equal gas streams at six microburners, each microburner having a substantially identical pattern and size.

13. The heater of claim 1, wherein the openings of the microburners are arranged to prevent back flow through the burner plate toward the fan blade.

14. A direct-fired heater connectable to ductwork, the heater comprising:

an outer shell comprising an inlet for allowing inlet of air to be heated and an outlet for exhausting heated air;

a fan blade operatively connected to a fan motor for operating the fan blade;

a combustion chamber with the outer shell defined by a combustion chamber wall, a burner plate at one end proximate the fan blade and an exhaust plate at an opposite end, the burner plate having openings therein for allowing rotating airflow from the fan blade into the combustion chamber and the exhaust plate have one or more openings therein for allowing exit of heated exhaust from the combustion chamber;

a heat shield between the combustion chamber wall and the outer shell;

a first airflow zone between the outer shell and the heat shield allowing airflow between the fan blade and the outlet in the outer shell;

a second airflow zone between the heat shield and the combustion chamber wall allowing airflow between the fan blade and the outlet in the outer shell;

a deflector segment for guiding airflow from the first and second airflow zones toward the outlet thereby mixing air exiting from the first airflow zone with the heated exhaust;

an injector for injecting gas into the combustion chamber in proximity to the openings in the burner plate;

a nose cone between the outlet in the outer shell and the exhaust plate, the nose cone positioned to allow airflow through the exhaust plate and out of the outlet; and a blower plate adjacent the outer perimeter of the fan blade for minimizing recirculated air from flowing past the fan blade, wherein the openings in the burner plate form a plurality of microburners, the injector adapted to inject a plurality of gas streams at the microburners;

each microburner comprises a plurality of openings, the openings of each microburner arranged in a pattern and the microburners spaced relative to each other resulting in a substantially continuous burn around the injector or a substantially symmetrical burn around the injector;

a total surface area of the openings of each microburner at a position closer to the injector is less than a total surface area of the openings of each microburner at a position farther to the injector, resulting in staged combustion in the combustion chamber;

the burner plate is located in a position proximate the fan blade suitable to cause recirculation of air blown by the fan blade to cool the injector during operation of the heater;

wherein one or both of either the heat shield or the combustion chamber wall extends past the burner plate toward the fan blade.

15. The heater of claim 14, wherein the heat shield extends past the combustion chamber wall and the combustion chamber wall extends past the burner plate toward the fan blade.

16. The heater of claim 14, wherein the deflector segment is integrated into the heat shield.

17. The heater of claim 14, wherein a clearance between the blower plate and the fan blade is small enough to substantially stop recirculated air from flowing past the fan blade.

18. The heater of claim 14, wherein the nose cone has a conical shape on an outlet side thereof.

19. The heater of claim 14, wherein the injector injects a substantially equal amount of gas at each microburner.

20. The heater of claim 14, wherein the combustion chamber wall and the heat shield are connected by a plurality of brackets, the brackets oriented at either an angle for straightening airflow through the second airflow zone or oriented at an angle for spinning airflow through the second airflow zone around the combustion chamber.

21. A direct-fired heater connectable to ductwork, the heater comprising:
   an outer shell comprising an inlet for allowing inlet of air to be heated and an outlet for exhausting heated air;
   a fan blade operatively connected to a fan motor for operating the fan blade;
   a combustion chamber with the outer shell defined by a combustion chamber wall, a burner plate at one end proximate the fan blade and an exhaust plate at an opposite end, the burner plate having openings therein for allowing rotating airflow from the fan blade into the combustion chamber and the exhaust plate have one or more openings therein for allowing exit of heated exhaust from the combustion chamber;
   a heat shield between the combustion chamber wall and the outer shell;
   a first airflow zone between the outer shell and the heat shield allowing airflow between the fan blade and the outlet in the outer shell;
   a second airflow zone between the heat shield and the combustion chamber wall allowing airflow between the fan blade and the outlet in the outer shell;
   a deflector segment for guiding airflow from the first and second airflow zones toward the outlet thereby mixing air exiting from the first airflow zone with the heated exhaust;
   an injector for injecting gas into the combustion chamber in proximity to the openings in the burner plate;
   a nose cone between the outlet in the outer shell and the exhaust plate, the nose cone positioned to allow airflow through the exhaust plate and out of the outlet; and
   a blower plate adjacent the outer perimeter of the fan blade for minimizing recirculated air from flowing past the fan blade, wherein
   the openings in the burner plate form a plurality of microburners, each microburner comprising at least one opening, the injector adapted to inject a plurality of gas streams at the microburners;
   a total surface area of the openings of each microburner at a position closer to the injector is less than a total surface area of the openings of each microburner at a position farther to the injector, resulting in staged combustion in the combustion chamber;
   the burner plate is located in a position proximate the fan blade suitable to cause recirculation of air blown by the fan blade to cool the injector during operation of the heater;
   one or both of either the heat shield or the combustion chamber wall extends past the burner plate toward the fan blade; and
   the injector injects six substantially equal gas streams at six microburners, each microburner having a substantially identical pattern and size.

22. The heater of claim 14, wherein the openings of the microburners are arranged to prevent back flow through the burner plate toward the fan blade.

23. The heater of claim 22, wherein the openings of the microburners are arranged to prevent back flow through the burner plate toward the fan blade.

* * * * *